(No Model.)
H. J. JOHNSON.
WAGON BRAKE.
No. 536,750.                    Patented Apr. 2, 1895.
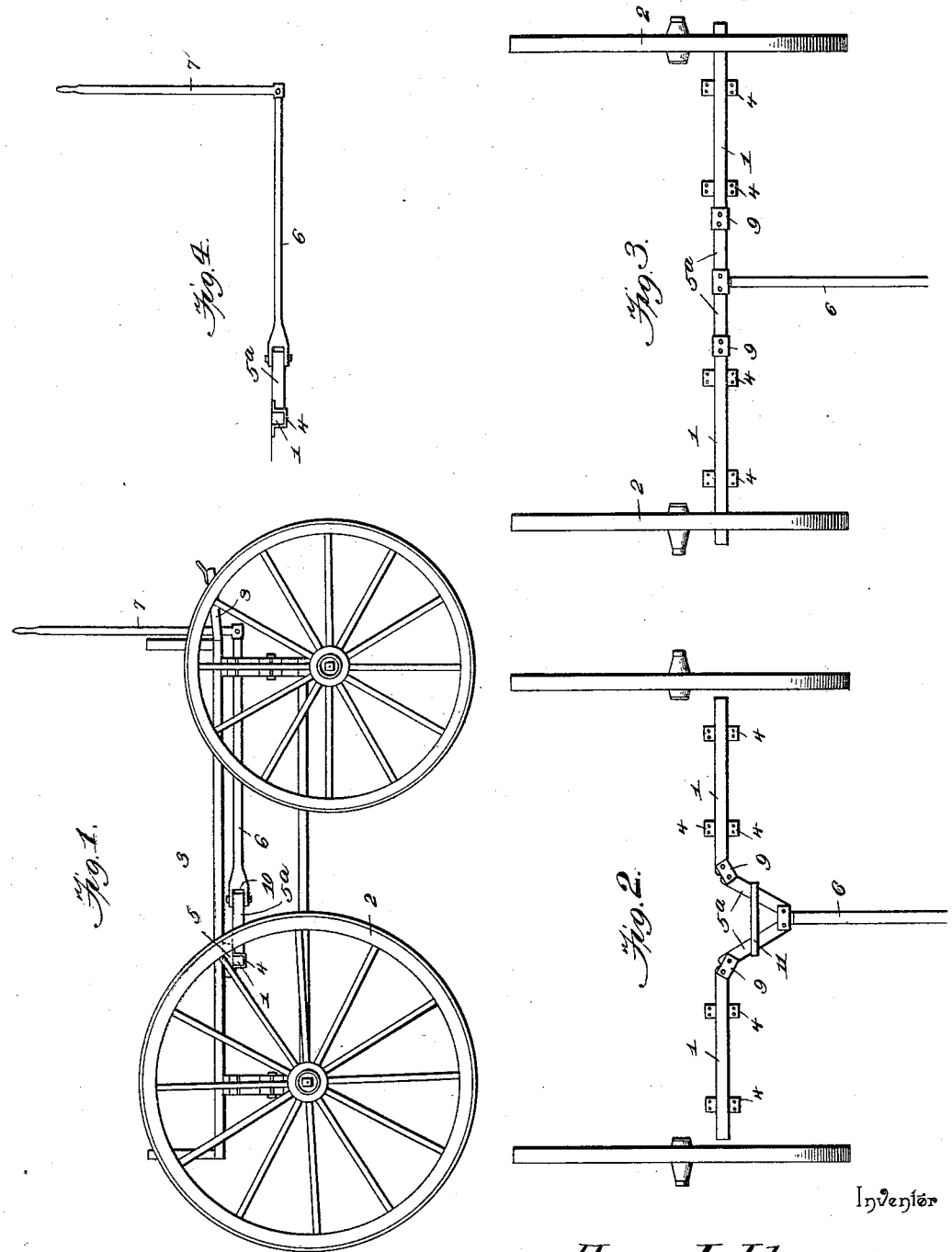
Witnesses
John C. Shaw
H. H. Riley
Inventor
Henry J. Johnson,
By his Attorneys.
C. A. Snow & Co.

UNITED STATES PATENT OFFICE.

HENRY J. JOHNSON, OF LOWELL, MASSACHUSETTS.

WAGON-BRAKE.

SPECIFICATION forming part of Letters Patent No. 536,750, dated April 2, 1895.

Application filed June 8, 1894. Serial No. 513,980. (No model.)

*To all whom it may concern:*

Be it known that I, HENRY J. JOHNSON, a citizen of the United States, residing at Lowell, Middlesex county, and State of Massachusetts, have invented a Wagon-Brake, of which the following is a specification.

The invention relates to improvements in wagon brakes.

The object of the present invention is to provide for vehicles a simple and efficient wagon brake, adapted to hold the wheels against rotation when it is desired to stop a vehicle in ascending or descending a hill or heavy grade, to permit the draft animals to rest without having the weight of the vehicle and its contents on them.

A further object of the invention is to provide such a brake which will be simple and inexpensive in its construction, positive and reliable in its operation, strong and durable, and capable of being readily applied to the ordinary construction of vehicles without requiring any change therein.

The invention consists in the construction and novel combination and arrangement of parts hereinafter fully described, illustrated in the accompanying drawings, and pointed out in the claims hereto appended.

In the drawings, Figure 1 is a side elevation of a vehicle provided with a brake constructed in accordance with this invention. Fig. 2 is a detail view of the brake illustrating the position of the parts, when the brake is not applied. Fig. 3 is a similar view, illustrating the position of the parts, when the brake is applied. Fig. 4 is a detail view of a portion of the brake operating mechanism.

Like numerals of reference designate corresponding parts in all the figures of the drawings.

1—1 designate a pair of similar transversely disposed wheel-engaging bars located opposite the hind wheels 2, of a vehicle 3, and slidingly mounted in guides or keepers 4, which are secured to a transverse bar 5. The bar 5 extends across and is secured to the lower face of the bottom of the body of the vehicle, but the guides or keepers 4 may be mounted on the vehicle in any other suitable manner. The guides or keepers have rectangular bends for the reception of the said engaging bars, which are preferably rectangular in cross section, but they may be of any other desired form. The inner ends of the wheel-engaging bars 1 are connected by a pair of forwardly converging links or bars $5^a$, with the rear end of a centrally located longitudinally disposed connecting rod 6, which extends to the front of the body of the vehicle, and is pivotally connected to the lower end of an operating lever 7, fulcrumed on the foot board 8, and extending upward through an opening in the same. The rear ends of the converging link-bars are hingedly connected with the wheel-engaging bars by means of plates 9, arranged on the upper and lower faces of those bars, and secured to them by pivots. The front ends of the link bars are pivoted in a horizontal bifurcation 10, of the rear end of the connecting rod and the link bars, when the brake is not applied as illustrated in Fig. 2 of the accompanying drawings, are arranged in a transverse guide 11, which supports the link bars.

The brake is applied by means of the operating lever, which is located within convenient reach of the seat of the body, and which is adapted to force the connecting rod rearward to slide the wheel-engaging bars outward, as illustrated in Fig. 3 of the accompanying drawings. The wheel-engaging rods are moved outward until their outer terminals are projected between spokes of the hind wheels, and the latter are thereby locked against rotation to permit a vehicle to be stopped in ascending or descending a hill, or other inclination to permit the draft animals to rest, at the same time to relieve them of the weight of the vehicle. When the wheel-engaging bars are extended the link bars assume a transverse position in alignment with the wheel-engaging bars, and form a lock to prevent the wheel engaging bars from moving inward. The hind wheels are relieved of the brake by drawing the connecting bar forward and sliding the wheel engaging bars inward.

It will be seen that the brake is simple and inexpensive in construction, that it is positive and reliable in its operation, and that it is capable of engaging a vehicle and of relieving the draft animals of the weight of the same.

Changes in the form, proportion, and the minor details of construction may be resorted to without departing from the principle or sacrificing any of the advantages of this invention.

What I claim is—

1. The combination with a vehicle, of a pair of wheel-engaging bars slidingly mounted thereon, and disposed transversely thereof, and arranged when moved outward to project between the spokes of the wheels, a connecting rod disposed longitudinally of the vehicle, a pair of link bars connected at their front ends to the rod, and at their rear ends to the inner ends of the wheel-engaging bars, and adapted to reciprocate the same, and to be interposed between them, and to form a brace for locking them in engagement with the wheels, and means for operating the connecting rod, substantially as described.

2. The combination of a vehicle, provided with guides, a pair of transversely disposed wheel-engaging bars slidingly mounted in the guides, a longitudinally disposed connecting rod, a pair of links having their front ends hingedly connected to the rear end of the rod, and similarly connected to the inner ends of the wheel-engaging bars, a guide receiving and supporting the links, and an operating lever connected with the front end of the rod, substantially as described.

HENRY J. JOHNSON.

Witnesses:
JOSEPH J. JOHNSON,
EDWARD CAVANAUGH.